(12) United States Patent
Kobayashi et al.

(10) Patent No.: US 9,876,235 B2
(45) Date of Patent: Jan. 23, 2018

(54) FUEL CELL INCLUDING CATHODE HAVING MAIN PHASE INCLUDING PEROVSKITE OXIDE AND SUB PHASE INCLUDING STRONTIUM SULFATE

(71) Applicant: NGK INSULATORS, LTD., Nagoya-shi, Aichi (JP)

(72) Inventors: Ayano Kobayashi, Nagoya (JP); Makoto Ohmori, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 518 days.

(21) Appl. No.: 14/335,033

(22) Filed: Jul. 18, 2014

(65) Prior Publication Data

US 2015/0024302 A1 Jan. 22, 2015

(30) Foreign Application Priority Data

Jul. 19, 2013 (JP) ................................. 2013-150633
Apr. 11, 2014 (JP) ................................. 2014-081874

(51) Int. Cl.
*H01M 4/86* (2006.01)
*H01M 4/90* (2006.01)
(Continued)

(52) U.S. Cl.
CPC ........... *H01M 4/9033* (2013.01); *B32B 18/00* (2013.01); *C04B 35/01* (2013.01); *C04B 35/26* (2013.01); *H01M 8/1213* (2013.01); *C04B 2235/3213* (2013.01); *C04B 2235/3227* (2013.01); *C04B 2235/3272* (2013.01); *C04B 2235/3275* (2013.01); *C04B 2235/448* (2013.01); *C04B 2235/80* (2013.01); *C04B 2237/34* (2013.01); *H01M 2004/8689* (2013.01); *H01M 2008/1293* (2013.01); *H01M 2300/0074* (2013.01)

(58) Field of Classification Search
CPC ... H01M 4/9033; H01M 8/1213; B32B 18/00; C04B 35/01; C04B 35/26
USPC .................................. 429/489, 523, 527, 528
See application file for complete search history.

(56) References Cited

U.S. PATENT DOCUMENTS

| 5,308,712 A | 5/1994 | Seike et al. |
| 2009/0011323 A1 | 1/2009 | Guan et al. |

FOREIGN PATENT DOCUMENTS

| JP | 4-301369 A | 10/1992 |
| JP | 7-267748 A | 10/1995 |

(Continued)

OTHER PUBLICATIONS

Pre-trial Examination and it's English translation for the corresponding Japanese patent application No. 2013-272692 issued on Jul. 23, 2014.

(Continued)

*Primary Examiner* — Sean P Cullen
(74) *Attorney, Agent, or Firm* — Global IP Counselors, LLP

(57) ABSTRACT

A fuel cell includes an anode, a cathode and a solid electrolyte layer that is disposed between the anode and the cathode. The cathode includes a main phase and a sub phase. The main phase is composed mostly of perovskite oxide which is expressed by the general formula $ABO_3$ and includes at least Sr at the A site. The sub phase is composed mostly of strontium sulfate. An occupied area ratio of the sub phase in a cross section of the cathode is no more than 10.2%.

11 Claims, 14 Drawing Sheets
(5 of 14 Drawing Sheet(s) Filed in Color)

(51) Int. Cl.
    H01M 8/12      (2016.01)
    H01M 8/1213    (2016.01)
    B32B 18/00     (2006.01)
    C04B 35/01     (2006.01)
    C04B 35/26     (2006.01)
    H01M 8/124     (2016.01)

(56) References Cited

FOREIGN PATENT DOCUMENTS

| | | |
|---|---|---|
| JP | 8-236138 A | 9/1996 |
| JP | 8-259346 A | 10/1996 |
| JP | 2002-367615 A | 12/2002 |
| JP | 2006-32132 A | 2/2006 |
| JP | 2007-87747 A | 4/2007 |
| JP | 2007-200693 A | 8/2007 |
| JP | 2008-243475 A | 10/2008 |
| JP | 2009-16351 A | 1/2009 |
| JP | 2010-225363 A | 10/2010 |
| JP | 2011-105582 A | 6/2011 |
| JP | 2011-150813 A | 8/2011 |

OTHER PUBLICATIONS

"Post-test analysis of silicon poisoning and phase decomposition in the SOFC cathode material La0.58Sr0.4Co0.2Fe0.8O3 by transmission electron microscopy" by Bucher et al. from Solid State Ionics, Diffusion & Reatctions Elsevier Science B.V. Netherlands, vol. 230, pp. 7-11, available online on Sep. 4, 2012.

"Sulfur Poisoning La0.6Sr0.4Co0.2Fe0.8O3 Cathode for SOFCs" by Wang et al. from Journal of The Electrochemical Society, vol. 158, No. 11, pp. B1391-B1397, issued on Oct. 5, 2011.

"Effect of strontium concentration on sulfur poisoning of LSCF cathodes" by Wang et al. from Solid State Ionics, Diffusion & Reatctions Elsevier Science B.V. Netherlands, vol. 225, pp. 157-160, available online on Jun. 16, 2012.

"Synthesis, structure and conductivity of sulfate and phosphate doped SrCoO3" by Hancock et al. from Journal of Solid State Chemistry, Orland, FL, U.S., vol. 184, No. 11, pp. 2972-2977, available online on Sep. 14, 2011.

Extended European Search Report for the corresponding European patent application No. 14177664.1 issued on Jan. 12, 2015.

Identification Result
| measured value [Å] | SrSO₄ (JCPDS #05-0593) Pnma (62) | | |
|---|---|---|---|
| | d [Å] | hkl | crystal zone axis |
| 3.00 | 2.97 | -2-1-1 | ⟨-1-35⟩ |
| 2.40 | 2.39 | 1-2-1 | |
| 2.49 | 2.47 | -310 | |
*SrSO₄  a=8.359Å b=5.352Å c=6.866Å
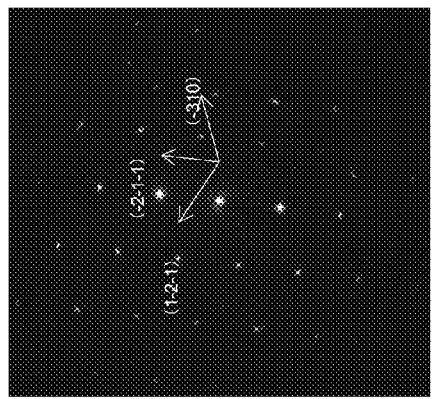
SAED Image
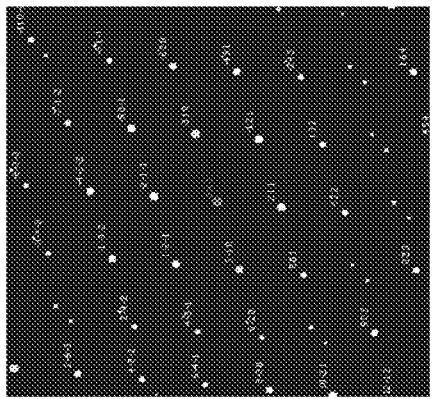
FIG. 14

FUEL CELL INCLUDING CATHODE HAVING MAIN PHASE INCLUDING PEROVSKITE OXIDE AND SUB PHASE INCLUDING STRONTIUM SULFATE

CROSS-REFERENCE TO RELATED APPLICATIONS

This application claims priority to Japanese Patent Application No.2013-150633 filed on Jul, 19, 2013 and Japanese Patent Application No.2014-81874 filed on Apr. 11, 2014. The entire disclosure of Japanese Patent Application No. 2013-150633 and Japanese Patent Application No. 2014-81874 is hereby incorporated herein by reference.

BACKGROUND

Technical Field

The present invention relates to a solid-oxide fuel cell and a cathode material.

Description of the Related Art

In recent years, fuel cell batteries have attracted attention in light of effective use of energy resources and environmental problems. A fuel cell includes a fuel battery cell and an interconnector. A fuel cell generally includes an anode, a cathode and a solid electrolyte layer that is disposed between the anode and the cathode. The cathode is configured with perovskite oxide such as LSCF: ((La, Sr)(Co, Fe)O$_3$), LSF: ((La, Sr) FeO$_3$), LSC: ((La, Sr)CoO$_3$), and the like. (For example, reference is made to Japanese Patent Application Laid-Open No. 2006-32132).

SUMMARY

However, a fuel cell provided with a cathode that is configured from the above materials is associated with the problem that the initial output tends to decrease. In this regard, the present inventors have gained the insight that one of the causes of a decrease in the initial output resides in an inactive region that is formed in the cathode inner portion, and such an inactive region is related to the proportion of strontium sulfate that is introduced into the cathode inner portion.

The present invention is proposed based on the above new insight and has the purpose of providing a fuel cell and a cathode material that enables enhancement of an initial output.

A fuel cell according to the present invention includes an anode, a cathode and a solid electrolyte layer that is disposed between the anode and the cathode. The cathode includes a main phase and a sub phase. The main phase is composed mostly of perovskite oxide which is expressed by the general formula ABO$_3$ and includes at least Sr at the A site. The sub phase is composed mostly of strontium sulfate. An occupied area ratio of the sub phase in a cross section of the cathode is no more than 10.2%.

The present invention provides a fuel cell and a cathode material that enables enhancement of an initial output.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Referring now to the attached drawings which form a part of this original disclosure:

FIG. 14 illustrates an example of identification results and a SAED image of the sub phase.

DETAILED DESCRIPTION OF THE PREFERRED EMBODIMENTS

Figure 1:
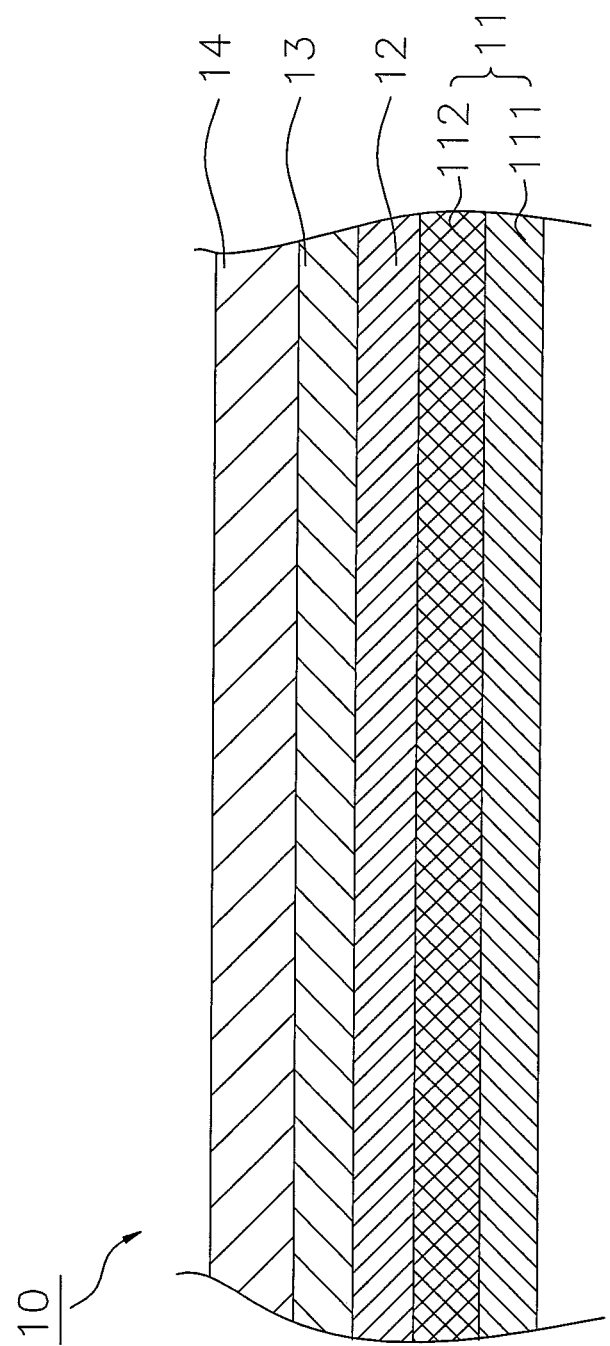
FIG. 1 is a cross sectional view illustrating the configuration of a fuel cell according to a first embodiment.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Next, the embodiments of the present invention will be described making reference to the figures. In the description of the figures below, the same or similar portions are denoted by the same or similar reference numerals. However, the figures are merely illustrative and the ratio of respective dimensions or the like may differ from the actual dimensions. Therefore, the actual dimensions or the like should be determined by reference to the following description. Furthermore, it goes without saying that the ratios or the relations of dimensions used in respective figures may be different.

In the following embodiments, a vertically-striped solid oxide fuel cell (SOFC) will be described as an example of a fuel cell.

1. First Embodiment

Configuration of Fuel Cell 10

The configuration of a fuel cell (abbreviated below to "cell") 10 will be described making reference to the figures. FIG. 1 is a cross sectional view of the configuration of the cell 10.

The cell 10 is a thin tabular body configured using a ceramic material. The thickness of the cell 10 is for example 300 micrometers to 3 mm, and the diameter of the cell 10 is 5 mm to 50 mm. A plurality of cells 10 is connected in series by an interconnector to form a fuel cell.

The cell 10 includes an anode 11, a solid electrolyte layer 12, a barrier layer 13 and a cathode 14.

The anode 11 has the function of an anode of the cell 10. The anode 11 as illustrated in FIG. 1 is configured from an anode current collector 111 and an anode active layer 112.

The anode current collector 111 may be configured as a porous tabular fired body including a transition metal and an oxygen ion conductive substance. The anode current collector 111 for example may include nickel oxide (NiO) and/or nickel (Ni) and yttria-stabilized zirconia (8YSZ, 10YSZ, or the like). The thickness of the anode current collector 111 may be 0.2 mm to 5.0 mm. The thickness of the anode current collector 111 may be the largest of each constituent member of the cell 10 when the anode current collector 111 functions as a base plate. The volume ratio of Ni and/or NiO in the anode current collector 111 may be 35 to 65 volume % using an Ni conversion, and the volume ratio of YSZ may be 35 to 65 volume %. The anode current collector 111 may include yttria ($Y_2O_3$) in substitution for YSZ.

The anode active layer 112 is disposed between the anode current collector 111 and the solid electrolyte layer 12. The anode active layer 112 is configured as a porous tabular fired body including a transition metal and an oxygen ion conductive substance. The anode active layer 112 for example may include NiO and/or Ni and yttria-stabilized zirconia in the same manner as the anode current collector 111. The thickness of the anode active layer 112 may be 5.0 micrometers to 30 micrometers. The volume ratio of Ni and/or NiO in the anode active layer 112 may be 25 to 50 volume % using an Ni conversion, and the volume ratio of YSZ may be 50 to 75 volume %. In this manner, the content ratio of YSZ in the anode active layer 112 may be greater than the anode current collector 111. The anode active layer 112 may include a zirconia based material such as scandia-stabilized zirconia (ScSZ) in substitution for YSZ.

The solid electrolyte layer 12 is disposed between the anode 11 and the barrier layer 13. The solid electrolyte layer 12 is configured as a dense tabular fired body. The solid electrolyte layer 12 has the function of enabling transmission of oxygen ions produced by the cathode 14. The solid electrolyte layer 12 includes zirconium (Zr). The solid electrolyte layer 12 may include Zr as zirconia ($ZrO_2$). The solid electrolyte layer 12 may include $ZrO_2$ as a main component.

In addition to $ZrO_2$, the solid electrolyte layer 12 may include an additive such as $Y_2O_3$ and/or $Sc_2O_3$. These additives may function as a stabilizer. In the solid electrolyte layer 12, the stabilizer may have a mol composition ratio with respect to the stabilizer $ZrO_2$ (stabilizer: $ZrO_2$) of 3:97-20:80. In other words, the material used in the solid electrolyte layer 12 may include zirconia-based materials such as ScSZ and yttria-stabilized zirconia such as 3YSZ, 8YSZ, and 10YSZ, or the like. The thickness of the solid electrolyte layer 12 is 3 micrometers to 30 micrometers.

The barrier layer 13 is disposed between the solid electrolyte layer 12 and the cathode 14. The barrier layer 13 is configured as a dense tabular fired body. The barrier layer 13 has the function of suppressing formation of a high resistive layer between the solid electrolyte layer 12 and the cathode 14. The material used in the barrier layer 13 includes cerium (Ce) and a ceria-based material including a rare earth metal oxide in solid solution in Ce. More specifically, the ceria-based material includes GDC (($Ce,Gd)O_2$: gadolinium doped ceria), SDC (($Ce, Sm)O_2$: samarium doped ceria), or the like. The thickness of the barrier layer 13 is 3 micrometers to 20 micrometers.

The cathode 14 is disposed on the barrier layer 13. The cathode 14 functions as the cathode of the cell 10. The thickness of the cathode 14 may be configured as 2 micrometers to 100 micrometers.

The cathode 14 is composed mostly of perovskite type oxide expressed by the general formula $ABO_3$ and including Sr at the A site. This type of perovskite type oxide includes a configuration of a perovskite type complex oxide that contains lanthanum and a perovskite type complex oxide that does not contain lanthanum. A perovskite type complex oxide that contains lanthanum includes LSCF (lanthanum strontium cobalt ferrite: $(La, Sr)(Co, Fe)O_3$), LSF (lanthanum strontium ferrite: $(La, Sr) FeO_3$), and LSC (lanthanum strontium cobaltite: $(La, Sr)CoO_3$). The perovskite type complex oxide that does not contain lanthanum for example includes SSC (samarium strontium cobaltite: $(Sm, Sr)CoO_3$), or the like. In the present embodiment, the feature of "A is composed mostly of B" means that at least 70% of A is configured by B. The density of the main phase may be configured as 5.5 $g/cm^3$~8.5 $g/cm^3$.

The cathode 14 includes a sub phase that is composed mostly of strontium sulfate ($SrSO_4$). The strontium sulfate ($SrSO_4$) may be configured as a solid solution containing the configuring element of the main phase (for example La, Co, or the like). Furthermore, the sub phase may contain impurities other than $SrSO_4$. The density of the sub phase may be configured as 3.2 $g/cm^3$~5.2 $g/cm^3$. The density of the sub phase may be smaller than the density of the main phase.

The occupied area ratio of the sub phase in a cross section of the cathode 14 is preferably no more than 10.2%. In this manner, a decrease in the initial output can be suppressed since the inactive region resulting in the inner portion of the cathode 14 is reduced. Furthermore, progressive deterioration of the cathode 14 resulting from a reaction between the sub phase and the main phase during current flow can be suppressed.

In the present embodiment, the feature of "occupied area ratio of X in a cross section of the cathode 14" means the proportion of the total surface area of X relative to the total surface area of the region with the exception of the pores included in the cathode 14 (that is to say, the solid phase of the cathode 14).

The occupied area ratio of the sub phase in a cross section of the cathode 14 is preferably at least 0.35%. In this manner, the sub phase that is composed mostly of $SrSo_4$ acts as a sintering auxiliary, and strengthens the backbone of the cathode 14 that has a porous structure. As a result, production of cracks in the cathode 14 during current flow can be suppressed and the durability of the cathode 14 can be enhanced.

The average value of the equivalent circle diameter of the constituent particles in the sub phase in the cross section of the cathode 14 is preferably at least 0.05 micrometers to no more than 2 micrometers. The durability of the cathode 14 can be enhanced by controlling to this range. The average value of the equivalent circle diameter is the arithmetic mean value of the diameter of a circle having the same surface area as the particles that configure the sub phase.

Method of Calculation of Occupied Area Ratio

Next, the method of calculating the occupied area ratio with reference to the cross section of the cathode 14 will be described making reference to FIG. 2 and FIG. 3.

1. FE-SEM Image

Figure 2:
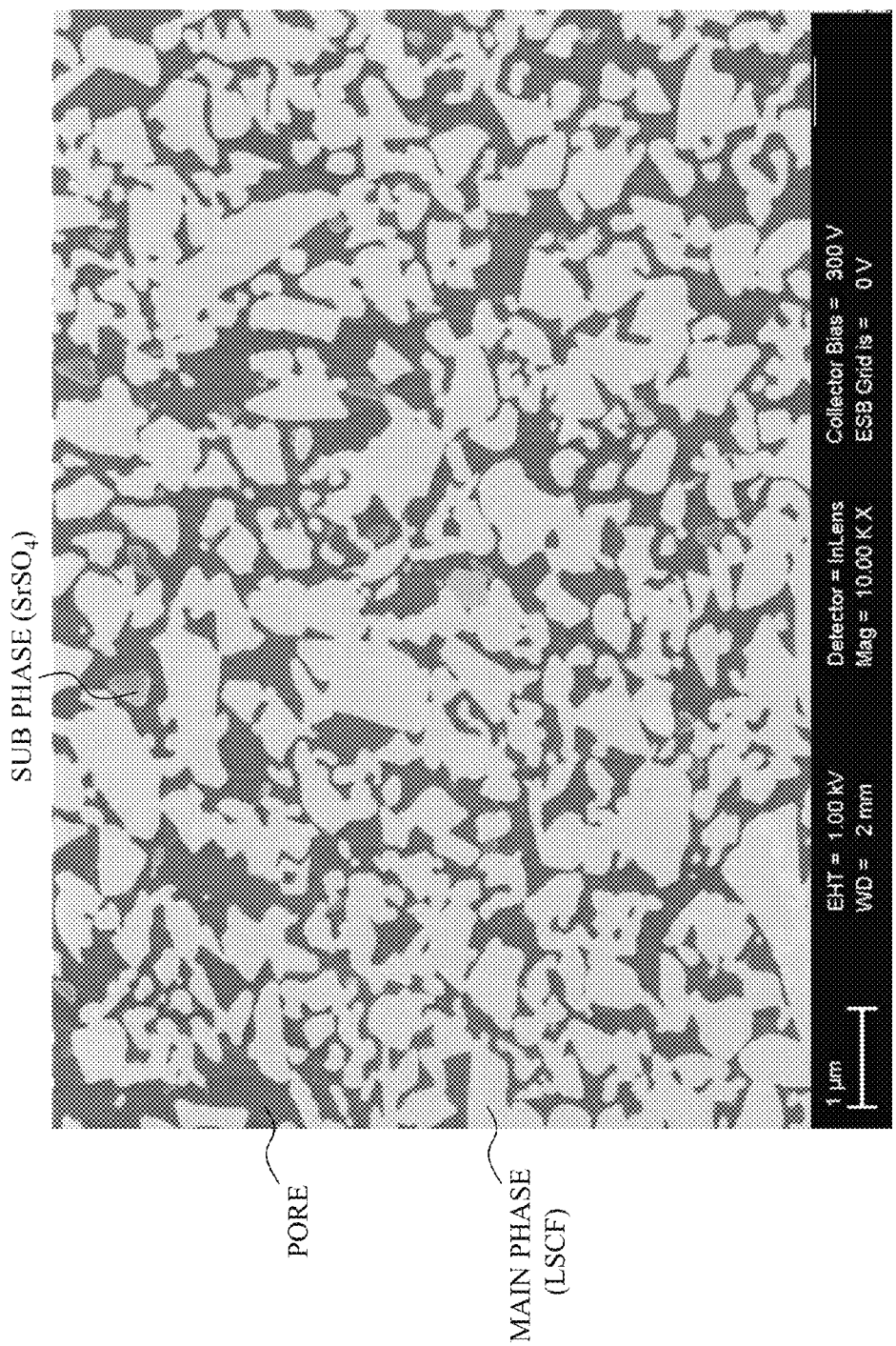
FIG. 2 illustrates an example of a FE-SEM image of a cathode cross section.

FIG. 2 is an image of a cross section of the cathode 14 enlarged with a magnification of 10,000 times by a field emission scanning electron microscope (FE-SEM) using an in-lens secondary electron detector. The FE-SEM image in FIG. 2 is obtained by an FE-SEM (model: ULTRA55) manufactured by Zeiss AG (Germany) with a working distance setting of 2 mm, and an acceleration voltage of 1 kV. The cross section of the cathode 14 is polished with precision machinery, and then ion milling processing is performed using an IM4000 manufactured by Hitachi High-Technologies Corporation. FIG. 2 illustrates an example of an image of the cathode 14 that contains a main constituent of LSCF.

In the FE-SEM image in FIG. 2, the contrast differs in relation to the display of the main phase (LSCF), the sub phase (SrSO$_4$) and the pores. The main phase is displayed as "faint gray", the sub phase as "gray" and the pores as "black". In this manner, three values assigned by the contrast can be realized by categorizing the luminosity of the image into 256 gradations.

The method of discriminating the main phase, the sub phase and the pores is not limited to the use of a contrast based on an FE-SEM image. For example, after acquiring an element mapping in the same field by use of scanning electron energy dispersive X-ray spectroscopy (SEM-EDS), the respective particles in the image are identified by illuminating and aligning the FE-SEM image to thereby arrive at three accurate values for the main phase, the sub phase and the pores.

2. Analysis of SEM Image

Figure 3:
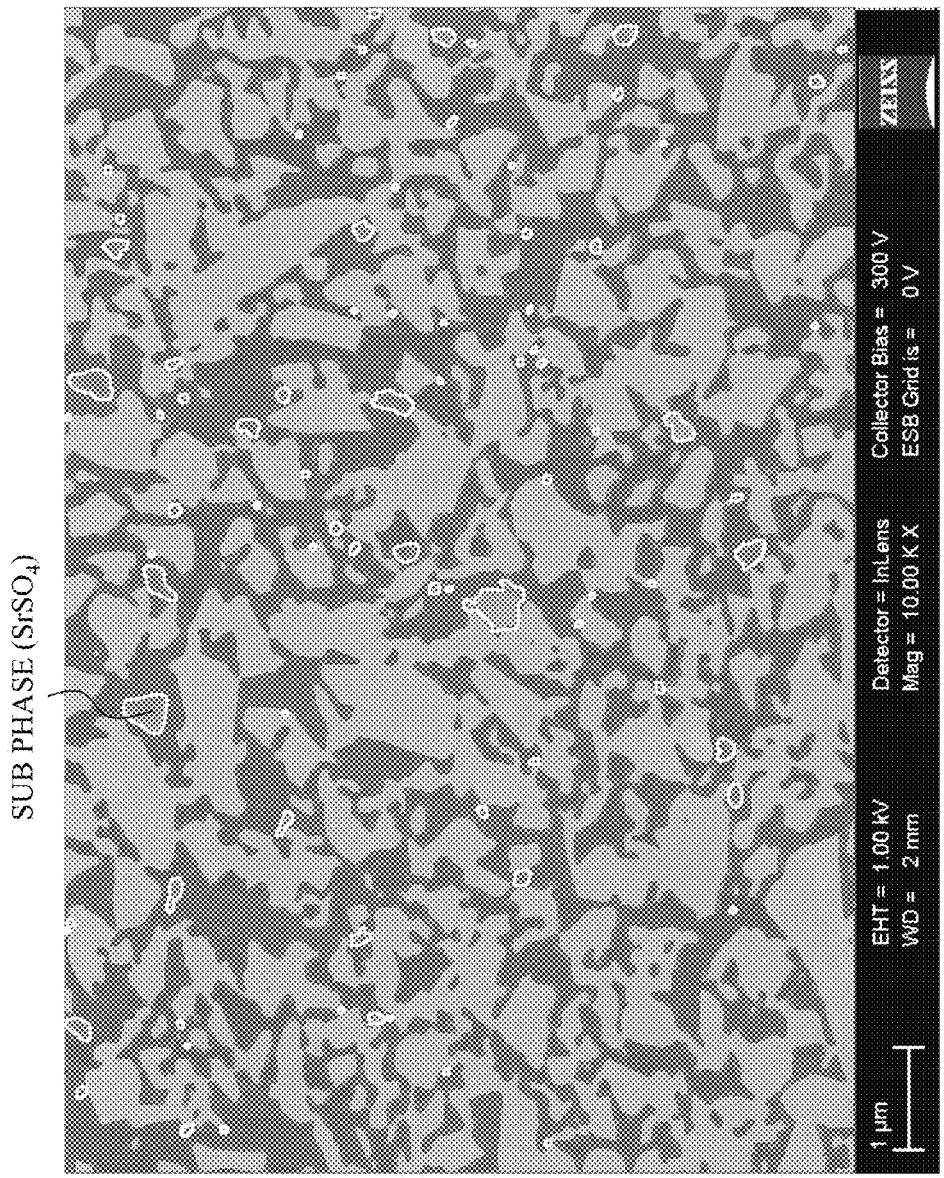
FIG. 3 illustrates the image analysis results of FIG. 2.

FIG. 3 illustrates the image analysis results for the FE-SEM image illustrated in FIG. 2 using HALCON image analysis software produced by MVTec GmbH (Germany). In FIG. 3, the sub phase is enclosed by the white solid line.

3. Calculation of Occupied Area Ratio

Firstly, the total surface area of the sub phase enclosed by the white solid line is calculated with reference to the analysis image in FIG. 3.

Next, the proportion of the total surface area of the sub phase to the total surface area of the cathode with the exception of the pores is calculated. The proportion of the total surface area of the sub phase calculated in this manner is taken to be the occupied area ratio of the sub phase.

The occupied area ratio of the main phase can also be calculated using the above method.

Cathode Material

The cathode material that configures the cathode 14 is preferably a mixture of SrSO$_4$ powder and a perovskite oxide powder that is expressed by the general formula ABO$_3$ and includes Sr at the A site. A perovskite oxide that includes Sr at the A site as stated above includes LSCF, LSF, LSC, SSC, or the like.

The added amount of SrSO$_4$ powder in the cathode material is preferably at least 0.11 wt %. In this manner, the occupied area ratio of the sub phase in the cross section of the cathode 14 can be controlled to at least 0.35%. Furthermore, the added amount of SrSO$_4$ powder in the cathode material is preferably no more than 11.7 wt %. In this manner, the occupied area ratio of the sub phase in the cross section of the cathode 14 can be controlled to no more than 10.2%.

Furthermore, since the density of the SrSO$_4$ powder is smaller than the density of the perovskite oxide powder, the density of the sub phase in the cathode 14 is smaller than the density of the main phase.

In addition, the occupied area ratio of the sub phase and the average value of the equivalent circle diameter of the constituent particles of the sub phase in the cathode 14 can be adjusted by adjusting the grain size of the SrSO$_4$ powder. An accurate classification that includes an upper limiting value and a lower limiting value is possible by adjusting the grain size of the SrSO$_4$ powder by use of an air classifier.

Method of Manufacturing Cell 10

Next, an example will be described of a manufacture method for the cell 10. However, respective conditions such as the material, the particle diameter, the temperature and the method of coating as described below may be varied as required. "Green body" below denotes a state prior to firing.

Firstly, a slurry is formed by adding polyvinyl alcohol (PVA) as a binder to a mixture of NiO powder, YSZ powder, and a pore forming agent (for example, PMMA poly(methyl methacrylate resin)). Next, the slurry is dried and granulated by use of a spray drier to form a powder for the anode current collector. Then, the powder for the anode is molded using a die press molding method to form a green body for the anode current collector 111.

Then, a slurry is formed by adding polyvinyl alcohol to the mixture of NiO powder, YSZ powder, and a pore forming agent. The slurry is printed onto the green body of the anode current collector 111 using a printing method to thereby form a green body for the anode active layer 112.

Next, a mixture of YSZ powder, water and a binder is mixed in a ball mill for 24 hours to prepare a slurry. Then the slurry is coated on the green body for the anode active layer 112, and dried to form a green body for the solid electrolyte layer 12. In substitution for a method of coating, a method such as a tape lamination method or a printing method may be used.

Then, a mixture of GDC powder, water and a binder is mixed in a ball mill for 24 hours to prepare a slurry. Then the slurry is coated on the green body for the electrolyte layer 12, and dried to form a green body for the barrier layer 13. In substitution for a method of coating, a method such as a tape lamination method or a printing method may be used.

As described above, a laminated body configured from the green body for the anode 11, the green body for the solid electrolyte layer 12 and the green body for the barrier layer 13 can be formed.

Then the laminated body formed from the green bodies is co-sintered for 2 to 20 hours at 1300 to 1600 degrees C. to form a co-fired body formed from a dense barrier layer 13 and solid electrolyte layer 12 and a porous anode 11.

Then, the above cathode material, water and a binder are mixed in a ball mill for 24 hours to prepare a slurry. The slurry is coated on the barrier layer 13 of the co-fired body, and dried to form the green body for the cathode 14. The green body for the cathode 14 is fired for one hour in an electric furnace (O$_2$ containing atmosphere, 1000 degrees C.) to form the porous cathode 14.

2. Second Embodiment

Configuration of Fuel Cell 20

Figure 4:
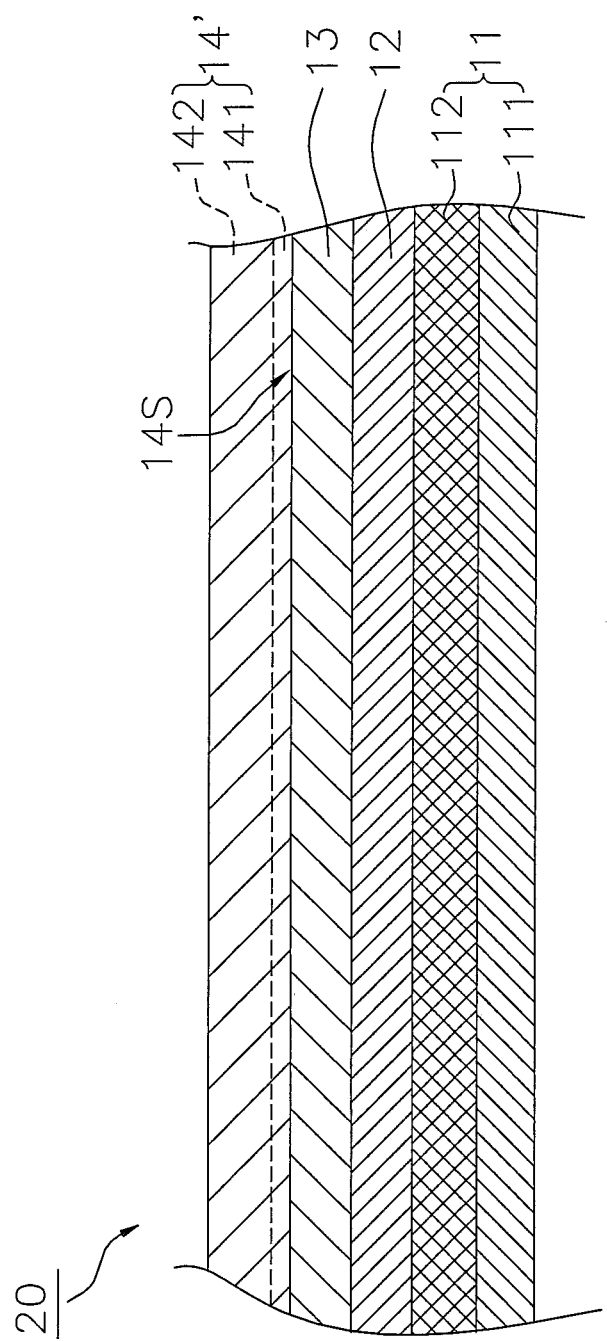
FIG. 4 is a cross sectional view illustrating the configuration of a fuel cell according to a second embodiment.

The configuration of a fuel cell 20 according to a second embodiment will be described making reference to the figures. FIG. 4 is a cross sectional view of the configuration of the cell 20. The point of difference between the cell 10 according to the first embodiment and the cell 20 according to the second embodiment resides in the feature that the occupied area ratio of the sub phase is only managed in relation to the region near the solid electrolyte layer 12 of a cathode 14'. The following description will focus mainly on the point of difference.

As illustrated in FIG. 4, the cathode 14' includes a first region 141 and a second region 142.

The first region is a region within 3 micrometers from the surface 14S near to the solid electrolyte layer 12. That is to say, the thickness of the first region 141 is 3 micrometers. The first region 141 is an example of the "solid electrolyte layer-side region". The cell 20 according to the present embodiment is configured by interposing the barrier layer 13 between the solid electrolyte layer 12 and the cathode 14' so that the first region 141 is in contact with the barrier layer 13. However, when the cell 20 is configured without provision of the barrier layer 13, the first region 141 is in contact with the solid electrolyte layer 12.

The surface 14S of the cathode 14' near the barrier layer 13 may describe a line of rapid variation in the density distribution when the component density is mapped in the cross section of the barrier layer 13 and the cathode 14'. Furthermore, the surface 14S of the cathode 14' near the barrier layer 13 may describe a line of rapid variation in porosity when the component density in the cross section of the barrier layer 13 and the cathode 14'.

The first region 141 includes a main phase composed mostly of perovskite oxide powder that is expressed by the general formula $ABO_3$ and includes Sr at the A site. This type of perovskite oxide includes LSCF, LSF, LSC, SSC, or the like. The density of the main phase in the first embodiment above can be configured to 5.5 g/cm$^3$~8.5 g/cm$^3$.

The first region 141 includes a sub phase that has strontium sulfate ($SrSO_4$) as a main component. The $SrSO_4$ may be configured as a solid solution containing the configuring element of the main phase (for example La, Co, or the like). Furthermore, the sub phase may contain impurities other than $SrSO_4$. The density of the sub phase may be configured as 3.2 g/cm$^3$~5.2 g/cm$^3$. The density of the sub phase may be smaller than the density of the main phase.

The occupied area ratio of the sub phase in a cross section of the first region 141 is preferably no more than 10.2%. In this manner, the film strength of the first region 141 can be enhanced, and large differences in thermal expansion between the barrier layer 13 and the solid electrolyte layer 12 can be suppressed by addition in excess of $SrSO_4$. As a result, peeling of the cathode 14' can be suppressed.

It is preferred that the occupied area ratio of the sub phase in a cross section of the first region 141 is at least 0.35%. In this manner, the film strength of the first region 141 can be sufficiently enhanced by addition of $SrSO_4$, and therefore peeling of the cathode 14' can be suppressed.

In the present embodiment, the feature of "occupied area ratio of X in a cross section of the first region 141" means the proportion of the total surface area of X relative to the total surface area of the region with the exception of the pores included in the first region 141 (that is to say, the solid phase of the first region 141). The detailed description of the calculation method of the occupied area ratio will be given below.

The average value of the equivalent circle diameter of the constituent particles in the sub phase in the cross section of the cathode 14' is preferably at least 0.05 micrometers to no more than 2 micrometers. The durability of the cathode 14' can be enhanced by controlling to this range. The average value of the equivalent circle diameter is the arithmetic mean value of the diameter of a circle having the same surface area as the particles that configure the sub phase.

The second region 142 is a region separated by at least 3 micrometers from the surface 14S near to the solid electrolyte layer 12. The thickness of the second region 142 may be configured to 5 to 100 micrometers. The second region 142 is disposed on the first region 141. In addition to the use of the same material as the first region 141, the second region 142 may include use of a known cathode material. The second region 142 may not include $SrSO_4$.

Method of Calculation of Occupied Area Ratio

Next, the method of calculating the occupied area ratio of the sub phase in the cross section of the cathode 14' will be described making reference to FIG. 5 and FIG. 6.

1. FE-SEM Image

Figure 5:
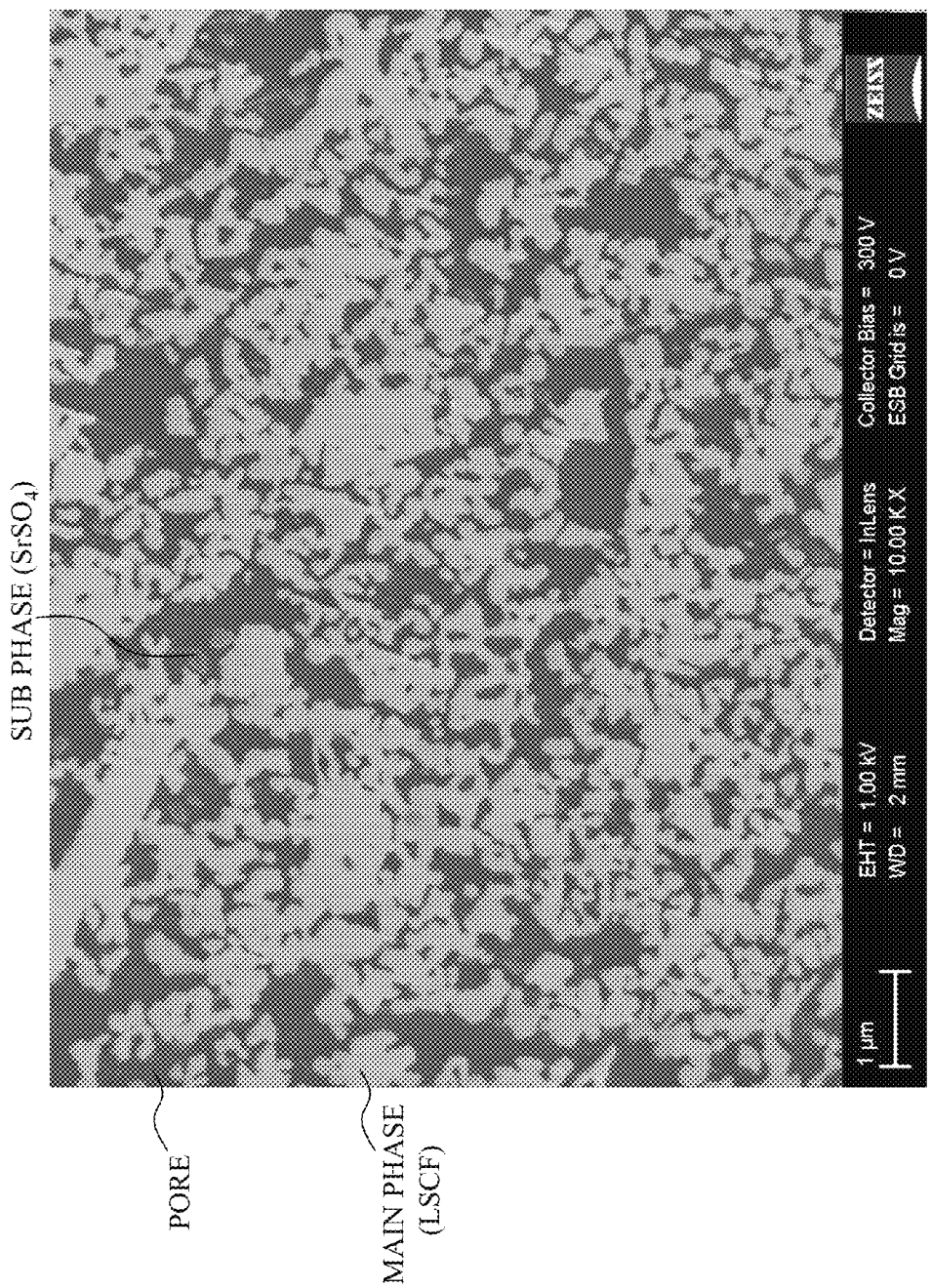
FIG. 5 illustrates an example of a FE-SEM image of a cross section of a solid electrolyte layer-side region.

FIG. 5 is an image of a cross section of the first region 141 enlarged with a magnification of 10,000 times by FE-SEM using an in-lens secondary electron detector. The FE-SEM image in FIG. 5 is obtained by an FE-SEM (model: ULTRA55) manufactured by Zeiss AG (Germany) with a working distance setting of 2 mm, and an acceleration voltage of 1 kV. The cross section of the first region 141 is polished with precision machinery, and then ion milling processing is performed using an IM4000 manufactured by Hitachi High-Technologies Corporation. FIG. 5 illustrates an example of an image of the first region 141 that contains a main constituent of LSCF.

In the FE-SEM image in FIG. 5, the contrast differs in relation to the display of the main phase (LSCF), the sub phase ($SrSO_4$) and the pores. The main phase is displayed as "faint gray", the sub phase as "gray" and the pores as "black". In this manner, three values assigned by the contrast can be realized by categorizing the luminosity of the image into 256 gradations.

The method of discriminating the main phase, the sub phase and the pores is not limited to the use of contrast based on an FE-SEM image. For example, after acquiring an element mapping in the same field by use of SEM-EDS, the respective particles in the image are identified by illuminating and aligning the FE-SEM image.

2. Analysis of FE-SEM Image

Figure 6:
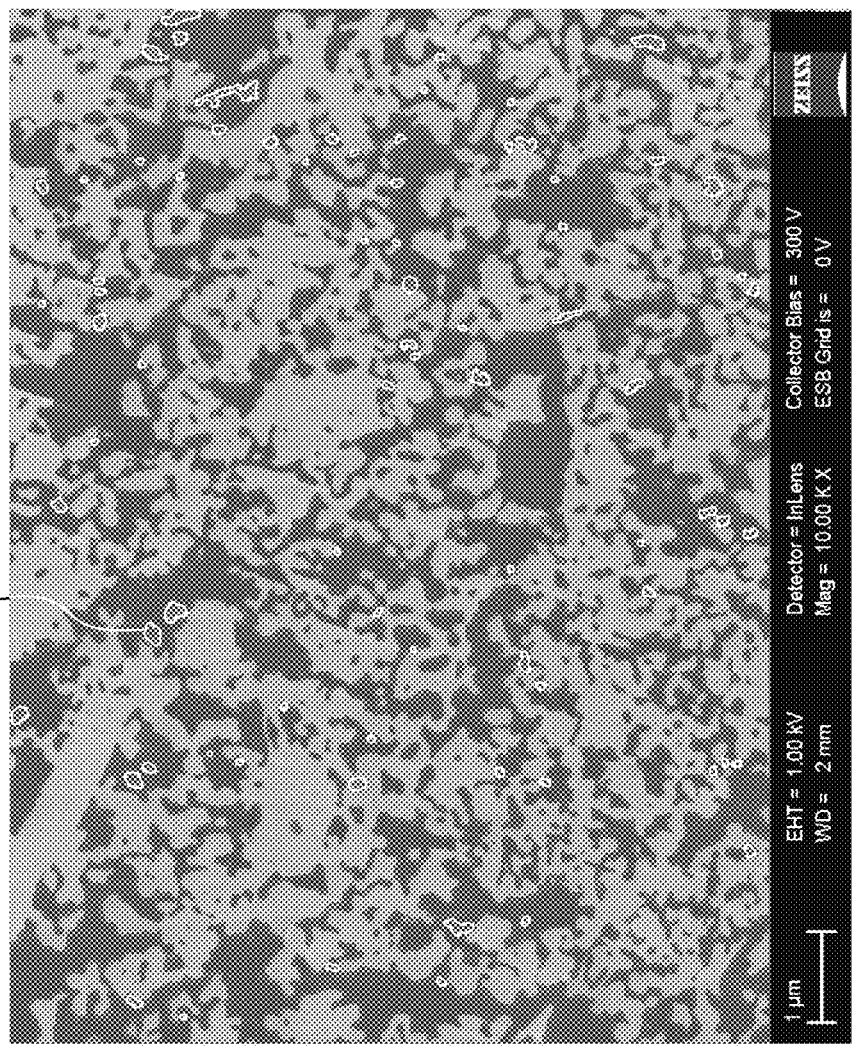
FIG. 6 illustrates the image analysis results of FIG. 5.

FIG. 6 illustrates the image analysis results for the FE-SEM image illustrated in FIG. 5 using HALCON image analysis software produced by MVTec GmbH. In FIG. 6, the sub phase is enclosed by the white solid line.

3. Calculation of Occupied area ratio

Firstly, the total surface area of the sub phase enclosed by the white solid line is calculated with reference to the analysis image in FIG. 6.

Next, the proportion of the total surface area of the sub phase to the total surface area of the cathode with the exception of the pores is calculated. The proportion of the total surface area of the sub phase calculated in this manner is taken to be the occupied area ratio of the sub phase.

The occupied area ratio of the main phase can also be calculated using the above method.

Method of Manufacturing Cell 20

Next, a manufacture method for the cell 20 according to the second embodiment will be described. Since the method of manufacturing the anode 11, the solid electrolyte layer 12 and the barrier layer 13 has been described above in the first embodiment, the following description will focus mainly on the manufacturing method for the cathode 14'.

Firstly, a co-fired body is prepared from the anode 11, the solid electrolyte layer 12 and the barrier layer 13.

Then, a slurry for the first region is prepared by mixing the cathode material for the first region 141 (including the main phase and sub phase described above), water, and a binder in a ball mill for 24 hours.

Next, the slurry for the first region is coated and dried onto the barrier layer 13 of the cofired body to thereby form a green body for the first region 141.

Then, a known cathode material (for example, LSCF, or the like), water and a binder are mixed in a ball mill for 24 hours to thereby prepare the slurry for the second region.

Next, the slurry for the second region is coated and dried onto the green body for the first region 141 to thereby form a green body for the second region 142.

Next, the green body for the first region 141 and the green body for the second region 142 are fired for one hour in an electric furnace ($O_2$ containing atmosphere, 1000 degrees C.) to form the cathode 14' on the barrier layer 13.

Other Embodiments

The present invention is not limited to the above embodiments and various modifications or changes are possible within a scope that does not depart from the spirit of the invention.

(A) In the above embodiment, although the cell 10 includes the anode 11, the solid electrolytic layer 12, the barrier layer 13 and the cathode 14, the invention is not thereby limited. The cell 10 may include the anode 11, the solid electrolytic layer 12 and the cathode 14, and another layer may be interposed between the respective layers. More specifically, a porous barrier layer may be interposed between the barrier layer 13 and the cathode 14.

(B) Although the above embodiment has been described in relation to a vertically striped cell 10, the cell 10 may be configured in an anode-support configuration, or tabular, cylindrical, horizontally striped, or the like. Furthermore, the cross section of the cell 10 may be oval, or the like.

(C) The second embodiment includes the configuration of the region within 3 micrometers from the surface 14S near to the solid electrolyte layer 12 of the cathode 14' as the first region 141 (solid electrolyte layer-side region). However, when the thickness of the cathode 14' is less than or equal to 3 micrometers, the whole of the cathode 14' may be configured as the first region 141 (solid electrolyte layer-side region).

EXAMPLES

Although the examples of the fuel cell according to the present invention will be described below, the present invention is not thereby limited to the following examples.

Preparation of Samples No. 1 to No. 20

As described below, Samples No. 1 to No. 20 of an anode support cell are prepared in which the anode current collection layer is configured as a support base plate.

Firstly, an anode current collection layer (NiO:8YSZ=50:50 (Ni volume % conversion)) having a thickness of 500 micrometers is formed using a die press molding method. In top of that layer, an anode active layer (NiO:8YSZ=45:55 (Ni volume % conversion)) having a thickness of 20 micrometers is formed using a printing method.

Then, an 8YSZ electrolyte having a thickness of 5 micrometers and a GDC barrier film having a thickness of 5 micrometers are formed in series on the anode active layer to thereby form a laminated body.

The laminated body is then co-sintered for two hours at 1400 degrees C. to obtain a co-fired body.

Thereafter, a slurry is prepared by mixing the cathode materials described in Table 1, water and a binder in a ball mill for 24 hours. The slurry is coated onto the barrier film, and baked for 2 hours at 1000 degrees C. to thereby prepare a cathode having a thickness of 30 micrometers. As described in Table 1, the main component of the cathode material included addition of a different amount of $SrSO_4$ powder for each sample and uses LSCF, LSF, and SSC.

Measurement of Occupied area ratio

Firstly, the cathode of each sample is polishing with precision machinery, and then ion milling processing is performed using an IM4000 manufactured by Hitachi High-Technologies Corporation.

An FE-SEM image of the cross section of the cathode enlarged with a magnification of 10,000 times by a FE-SEM using an in-lens secondary electron detector is acquired (reference is made to FIG. 2).

Then, an analysis image is acquired by analyzing the FE-SEM image for each sample using HALCON image analysis software produced by MVTec GmbH (reference is made to FIG. 3).

Then, the occupied area ratio of the sub phase configured by $SrSO_4$ is calculated with reference to the analysis image. The calculation results for the occupied area ratio of the sub phase are shown in Table 1.

Component Analysis of Sub phase

Next, component analysis of the sub phase is performed to confirm that the sub phase is composed mostly of $SrSO_4$.

Figure 7:
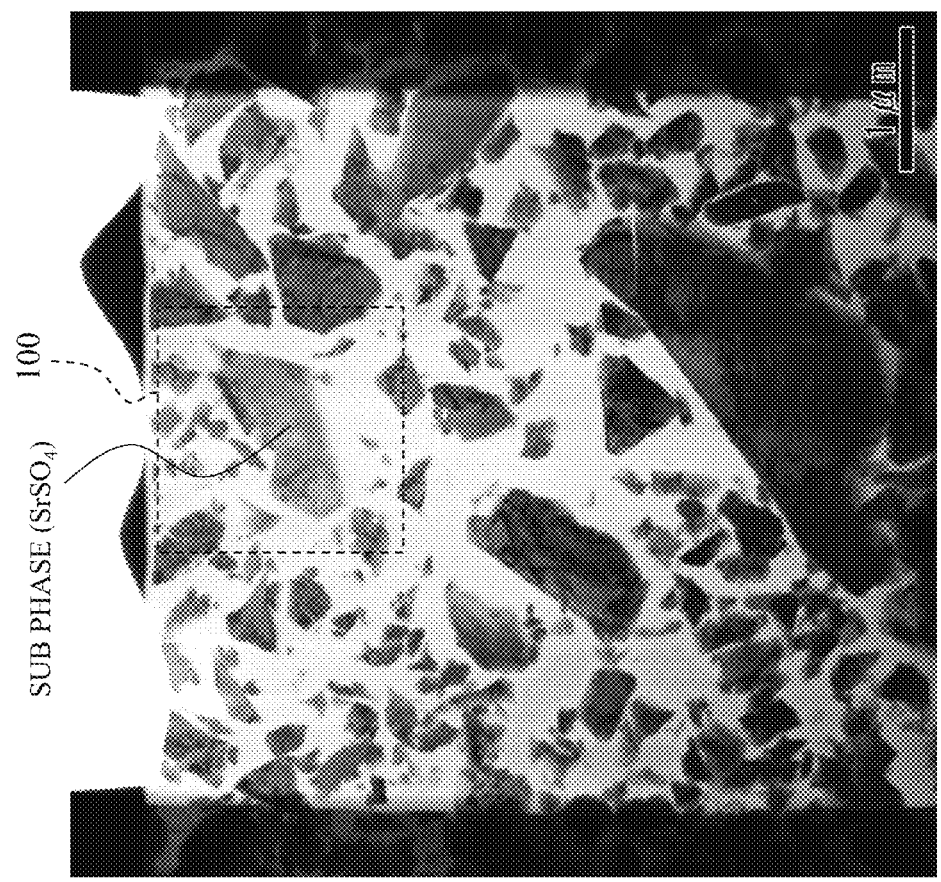
FIG. 7 illustrates an example of a TEM image of a cathode cross section.

Firstly, a TEM image of the cathode cross section is acquired by use of a transmission electron microscope (TEM). FIG. 7 illustrates an example of a TEM image of a cathode cross section, and the position of the sub phase can be confirmed with reference to the TEM image.

Figure 8:
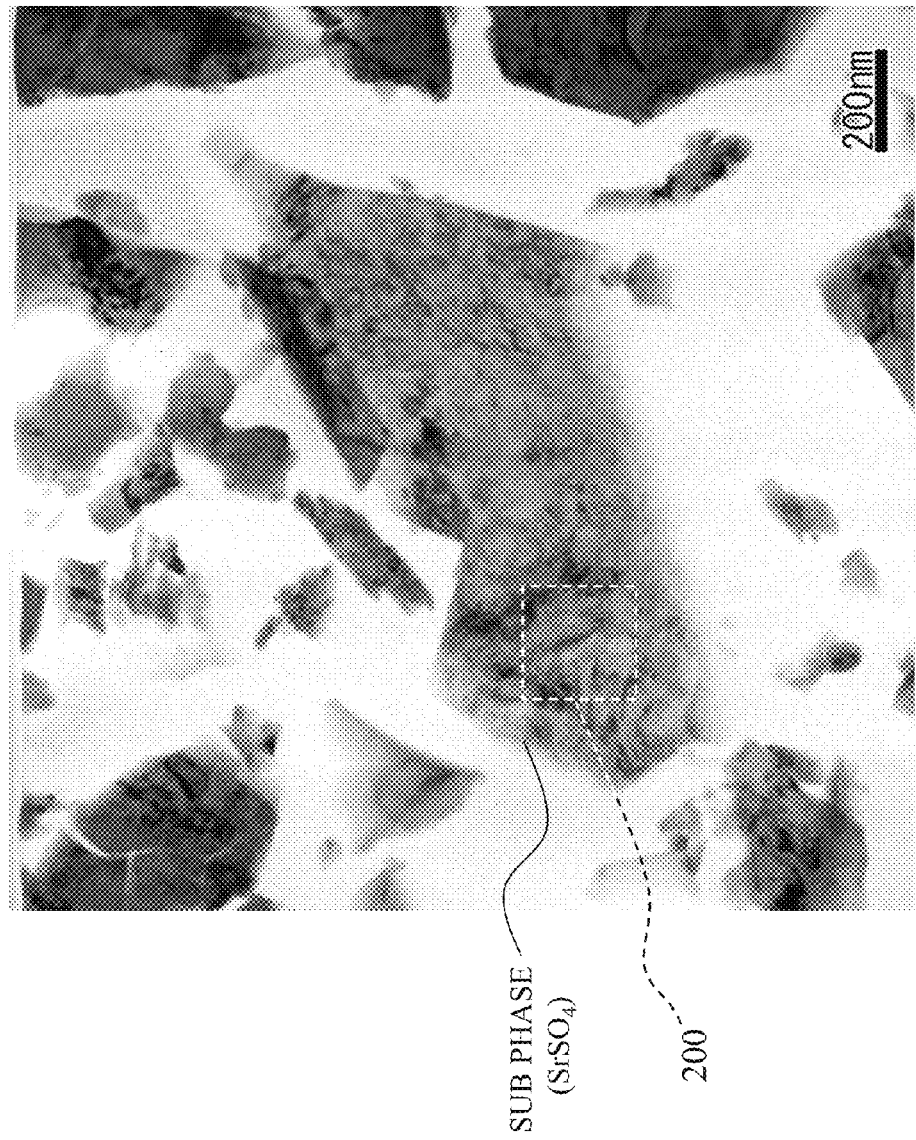
FIG. 8 illustrates a partial enlargement of FIG. 4.

Next, an energy dispersive x-ray spectroscopy (EDX) is used to acquire an EDX spectrum in the region 200 of FIG. 8 (an enlarged view of the region 100 in FIG. 7).

Figure 9:
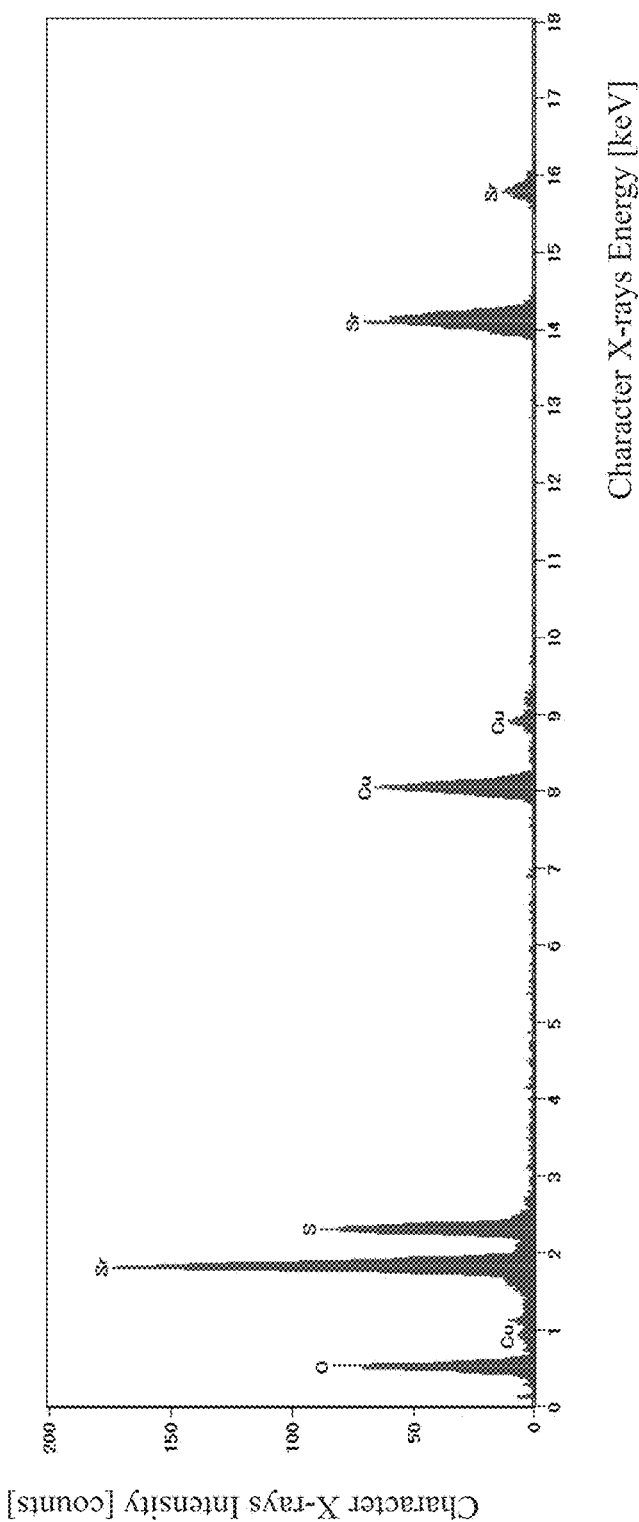
FIG. 9 illustrates a graph illustrating an example of an EDX spectrum of the sub phase.

FIG. 9 is a graph illustrating an example of an EDX spectrum of the sub phase. Semi-quantitative analysis of the EDX spectrum enables an inference regarding the constituent properties of the sub phase. The graph in FIG. 9 illustrates detection of a characteristic X ray for Sr, S, O. In FIG. 9, although the characteristic X ray for Cu is detected, this is due to the component for the sample holder in the analytic device and not a constituent property of the sub phase.

Figure 10:
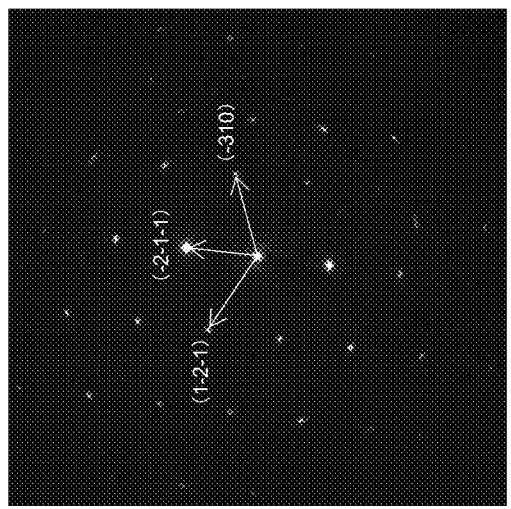
FIG. 10 illustrates an example of identification results and a SAED image of the sub phase.

Next, the crystalline structure (lattice constant, lattice configuration, crystal orientation) of the constituent particles in the sub phase is analyzed by selected area electron diffraction (SAED). FIG. 10 illustrates an example of a sub phase SAED image and identification results. The feature that the sub phase composed mostly of $SrSO_4$ is confirmed through the identification results above by analyzing the lattice constant, the lattice configuration, and the crystal orientation based on the SAED image.

Property Evaluation Testing and Durability Testing

Samples No. 1 to No. 20 were heated to 750 degrees C. while supplying nitrogen gas to the anode side and air to the cathode side. When 750 degrees C. is reached, a reduction process was performed for three hours while supplying hydrogen gas to the anode.

Thereafter, the output density (initial output) at a rated current density of 0.2 A/cm$^2$ and at a temperature of 750 degrees C. is measured for Samples No. 1 to No. 20. The measurement results are summarized in Table 1. In Table 1, samples that exhibit an output density of at least 0.15 W/cm$^2$ are evaluated as good.

Thereafter, the voltage drop rate per 1000 hours is measured as a deterioration rate. The measurement results are summarized in Table 1. In Table 1, samples that exhibit a deterioration rate of no more than 1.5% are evaluated as particularly good.

Confirmation of Minute Cracks in Cathode After Durability Testing

After the durability testing above, the presence or absence of cracks is observed by observation with an electron microscope of the cross section of the cathode. The measurement results are summarized in Table 1.

TABLE 1

| Sample | Main Component of Cathode Material | Occupied Surface Area Ratio of $SrSO_4$ in Cathode Cross Section (%) | Content Ratio $SrSO4$ in Cathode Material (wt %) | Equivalent Circle Diameter of Particles containing $SrSO_4$ in Cathode Cross Section (μm) | Output Density (W/cm$^2$) | Presence/Absence of Minute Cracks after Durability Testing | Deterioration Ratio after Durability Testing (%) | Evaluation |
|---|---|---|---|---|---|---|---|---|
| No. 1 | LSCF | 0.21 | 0.10 | 0.12 | 0.36 | Yes (minute) | 0.41 | ○ |
| No. 2 | LSCF | 0.35 | 0.11 | 0.05 | 0.45 | No | 0.6 | ◎ |
| No. 3 | LSCF | 0.52 | 0.56 | 0.25 | 0.26 | No | 0.81 | ◎ |
| No. 4 | LSCF | 1.2 | 1.4 | 0.44 | 0.32 | No | 0.72 | ◎ |
| No. 5 | LSCF | 2.3 | 3.2 | 0.68 | 0.31 | No | 0.55 | ◎ |
| No. 6 | LSCF | 3.6 | 5.6 | 0.98 | 0.33 | No | 0.44 | ◎ |
| No. 7 | LSCF | 4.5 | 7.3 | 1.2 | 0.18 | No | 0.63 | ◎ |
| No. 8 | LSCF | 6.3 | 8.2 | 1.7 | 0.26 | No | 0.88 | ◎ |
| No. 9 | LSCF | 8.9 | 9.6 | 2.0 | 0.18 | No | 1.5 | ◎ |
| No. 10 | LSCF | 10.2 | 11.7 | 2.5 | 0.15 | No | 1.8 | ◎ |
| No. 11 | LSCF | 11.5 | 13.2 | 1.8 | 0.10 | No | 1.3 | X |
| No. 12 | LSF | 0.20 | 0.09 | 0.35 | 0.33 | Yes (minute)) | 0.98 | ○ |
| No. 13 | LSF | 1.6 | 2.1 | 0.56 | 0.28 | No | 0.88 | ◎ |
| No. 14 | LSF | 4.2 | 4.8 | 0.68 | 0.22 | No | 1.1 | ◎ |
| No. 15 | LSF | 9.8 | 10.5 | 1.2 | 0.18 | No | 0.63 | ◎ |
| No. 16 | LSF | 12.1 | 12.8 | 0.96 | 0.09 | No | 0.85 | X |
| No. 17 | SSC | 4.5 | 5.2 | 1.5 | 0.25 | No | 0.75 | ◎ |
| No. 18 | SSC | 6.3 | 7.1 | 0.78 | 0.33 | No | 1.2 | ◎ |
| No. 19 | SSC | 8.9 | 9.3 | 1.6 | 0.26 | No | 0.84 | ◎ |
| No. 20 | SSC | 13.2 | 13.9 | 0.82 | 0.11 | No | 1.3 | X |

As illustrated in Table 1, the output density has been enhanced to at least 0.15 W/cm$^2$ in samples in which the occupied area ratio of $SrSO_4$ in the cathode cross section is suppressed to no more than 10.2% by limiting the $SrSO_4$ contained in the cathode material to no more than 11.7 wt %. This feature is due to the fact that the inactive region in the cathode is reduced. Furthermore, those samples suppress the deterioration rate during durability testing to no more than 1.8%. This is due to the fact that, the progression of deterioration of the cathode during current flow due to reaction of the main phase with $SrSO_4$ contained in the sub phase is suppressed.

As illustrated in Table 1, the addition of at least 0.11 wt % of $SrSO_4$ to the cathode material suppresses the production of minute cracks after durability testing in samples exhibiting an occupied area ratio of $SrSO_4$ in the cathode cross section of at least 0.35%. This feature is due to the fact that the backbone of the porous structure is strengthened as a result of an improvement to sintering characteristics of the cathode by inclusion of at least 0.11 wt % of $SrSO_4$ in the cathode material.

As illustrated in Table 1, the deterioration rate is suppressed to no more than 1.5% in samples exhibiting an average value of the equivalent circle diameter of the particles containing $SrSO_4$ of at least 0.05 micrometers to no more than 2 micrometers.

Preparation of Samples No. 21 to No. 40

As described below, Samples No. 21 to No. 40 of an anode support cell were prepared in which the anode current collection layer is configured as a support base plate.

Firstly, an anode current collection layer (NiO:8YSZ=50:50 (Ni volume % conversion)) having a thickness of 500 micrometers is formed using a die press molding method. In top of that layer, an anode active layer (NiO:8YSZ=45:55 (Ni volume % conversion)) having a thickness of 20 micrometers is formed using a printing method.

Then, an 8YSZ electrolyte having a thickness of 5 micrometers and a GDC barrier film having a thickness of 5 micrometers are formed in series on the anode active layer to thereby form a laminated body.

The laminated body is then co-sintered for two hours at 1400 degrees C. to obtain a co-fired body.

Thereafter, a slurry is prepared by mixing cathode materials including a sub phase ($SrSO_4$) and a main phase as described in Table 2, water and a binder in a ball mill for 24 hours. The slurry is coated onto the barrier film to thereby prepare a green body for the first region of the cathode. As described in Table 1, the added amount of $SrSO_4$ to the cathode material of each sample is adjusted in order to control the occupied area ratio of $SrSO_4$ in the first region.

Thereafter, a slurry for the second region is prepared by mixing LSCF, water and a binder in a mill. The slurry for the second region is coated onto the green body for the first region to thereby prepare a green body for the second region of the cathode.

Next, the green body for the first region and the green body for the second region are fired for two hours at 1000 degrees C. to prepare Samples No. 21 to No. 40 as an anode supporting coin cell (phi=15 mm).

Measurement of Occupied Area Ratio

After polishing the first region of the cathode of Samples No. 21 to No. 40 with precision machinery, ion milling processing is performed using an IM4000 manufactured by Hitachi High-Technologies Corporation.

An FE-SEM image of the cross section of the cathode enlarged with a magnification of 10,000 times by FE-SEM using an in-lens secondary electron detector is acquired (reference is made to FIG. 5).

Then, an analysis image is acquired by analyzing the FE-SEM image for each sample using HALCON image analysis software produced by MVTec GmbH (reference is made to FIG. 6).

Next, the occupied area ratio of the sub phase configured by $SrSO_4$ is calculated with reference to the analysis image. The calculation results for the occupied area ratio of the sub phase are shown in Table 2.

Component Analysis of Sub phase

Next, component analysis of the sub phase is performed to confirm that the sub phase of the first region is composed mostly of $SrSO_4$.

Figure 11:
FIG. 11 illustrates an example of a TEM image of a solid electrolyte layer-side region cross section.

Firstly TEM is used to acquire a TEM image of the cathode cross section. FIG. 11 is an example of a TEM image of the cathode cross section. The position of the sub phase is confirmed with reference to this TEM image.

Figure 12:
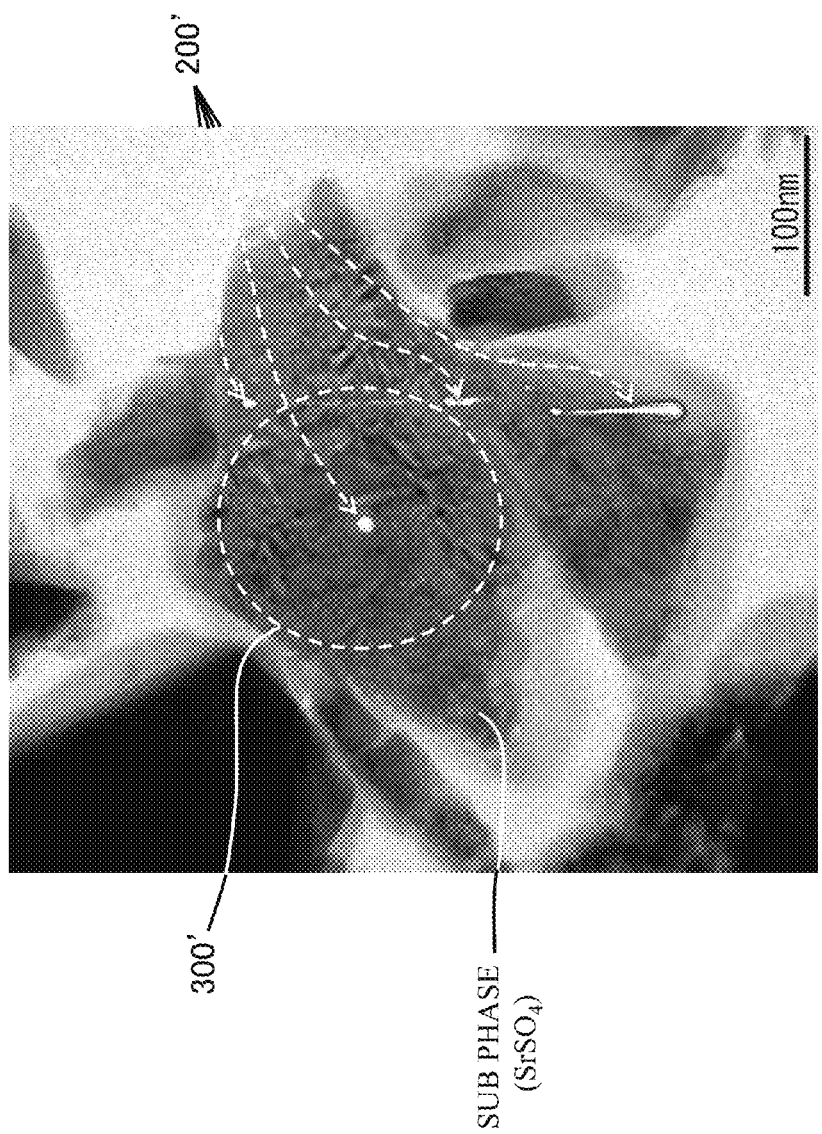
FIG. 12 illustrates a partial enlargement of FIG. 11.

Then, an EDX spectrum is acquired in relation to the four regions 200' in FIG. 12 (an enlarged view of the region 100' in FIG. 11) by use of EDX. In FIG. 12, a linear irradiation mark is formed in the four regions 200'.

Figure 13:
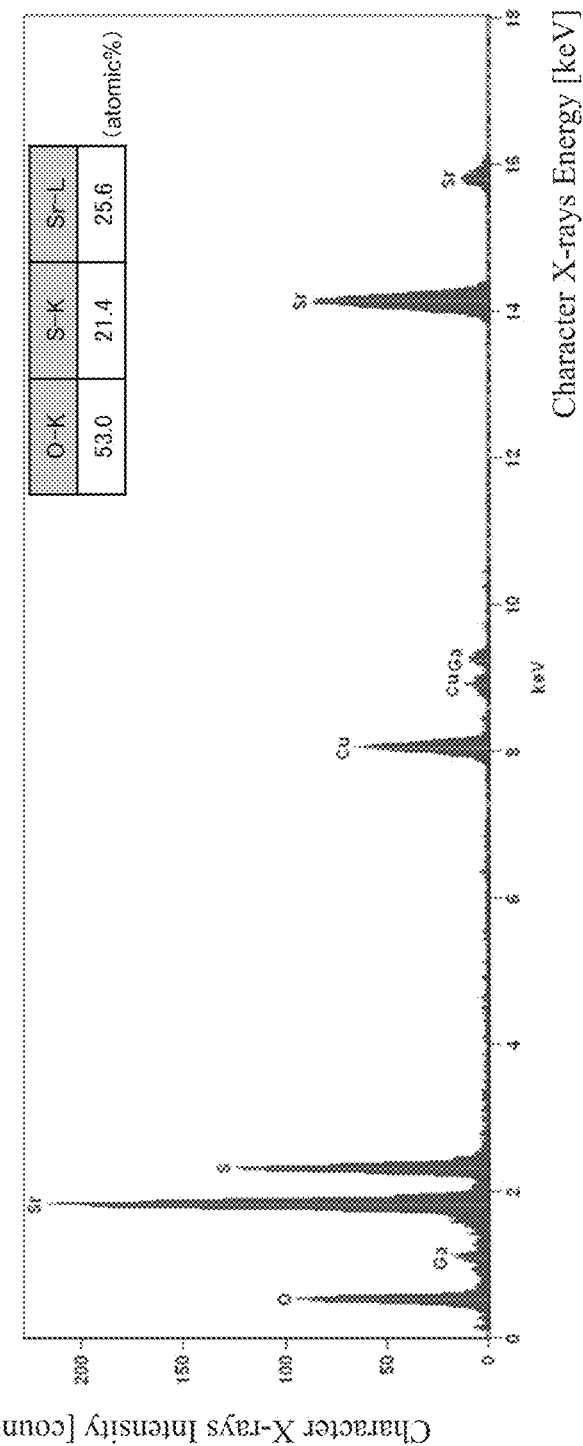
FIG. 13 illustrates a graph illustrating an example of an EDX spectrum of the sub phase.

FIG. 13 illustrates a graph illustrating an example of a sub phase EDX spectrum. Semi-quantitative analysis of the EDX spectrum enables an inference regarding the constituent properties of the sub phase. The graph in FIG. 13 illustrates detection of a characteristic X ray for Sr, S, O. In FIG. 13, although the characteristic X ray for Cu is detected, this is due to the component for the sample holder in the analytic device and not a constituent property of the sub phase.

Next, the crystalline structure of the constituent particles in the sub phase of the region 300' in FIG. 12 is analyzed by SAED. FIG. 14 illustrates an example of a sub phase SAED image and identification results. The feature that the sub phase is composed mostly of $SrSO_4$ is confirmed through the identification results above by analyzing the lattice constant, the lattice configuration, and the crystal orientation based on the SAED image.

Heat Cycle Testing and Durability Testing

Samples No. 21 to No. 40 were heated from ambient temperature to 750 degrees C. while supplying nitrogen gas to the anode side and air to the cathode side. The process is repeated 10 times for samples which fall to ambient temperature in four hours.

Thereafter, the presence or absence of peeling at the interface between the cathode and the barrier layer is confirmed by electron microscope observation of the cathode cross section for each sample. The results are summarized in Table 2.

In Table 2, the samples that are confirmed to exhibit peeling associated with a risk of an effect on the characteristic properties of the cathode are evaluated by "X", the samples that are confirmed to exhibit minute peeling not associated with a risk of an effect on the characteristic properties of the cathode are evaluated by "O", and samples not exhibiting peeling are evaluated by "⊚".

TABLE 2

| Sample | Main Phase of First Region | Occupied Surface Area Ratio of SrSO4 in First Region (%) | Presence/Absence of Interface Peeling after Heat Cycle Testing | Evaluation |
| --- | --- | --- | --- | --- |
| No. 21 | LSCF | 0.21 | Yes (minute) | O |
| No. 22 | LSCF | 0.35 | No | ⊚ |
| No. 23 | LSCF | 0.52 | No | ⊚ |
| No. 24 | LSCF | 1.2 | No | ⊚ |
| No. 25 | LSCF | 2.3 | No | ⊚ |
| No. 26 | LSCF | 3.6 | No | ⊚ |
| No. 27 | LSCF | 4.5 | No | ⊚ |
| No. 28 | LSCF | 6.3 | No | ⊚ |
| No. 29 | LSCF | 8.9 | No | ⊚ |
| No. 30 | LSCF | 10.2 | No | ⊚ |
| No. 31 | LSCF | 11.5 | Yes | X |
| No. 32 | LSF | 0.20 | Yes (minute) | O |
| No. 33 | LSF | 1.6 | No | ⊚ |
| No. 34 | LSF | 4.2 | No | ⊚ |
| No. 35 | LSF | 9.8 | No | ⊚ |
| No. 36 | LSF | 12.1 | Yes | X |
| No. 37 | SSC | 4.5 | No | ⊚ |
| No. 38 | SSC | 6.3 | No | ⊚ |
| No. 39 | SSC | 8.9 | No | ⊚ |
| No. 40 | SSC | 13.2 | Yes | X |

As illustrated in Table 2, interface peeling is suppressed in those samples in which the occupied area ratio of the sub phase of the first region (solid electrolyte layer-side region) is no more than 10.2%. This is due to the fact that the film strength of the first region is enhanced by addition of $SrSO_4$, and thereby an increase in the thermal expansion difference with the barrier layer resulting from excess addition of $SrSO_4$ can be suppressed.

As illustrated in Table 2, minute interface peeling is also suppressed in those samples in which the occupied area ratio of the sub phase of the first region is no more than 0.35%. This is due to the fact that the film strength of the first region is sufficiently enhanced by ensuring the addition amount of $SrSO_4$.

REFERENCE SIGNS LIST

10, 20 FUEL CELL
11 ANODE
111 ANODE CURRENT COLLECTOR
112 ANODE ACTIVE LAYER
12 SOLID ELECTROLYTE LAYER
13 BARRIER LAYER
14, 14' CATHODE
141 FIRST REGION (SOLID ELECTROLYTE LAYER-SIDE REGION)
142 SECOND REGION

What is claimed is:

1. A cathode material comprising:
   strontium sulfate and perovskite oxide which is expressed by the general formula $ABO_3$ and includes at least Sr at the A site and at least one of Co and Fe at the B site,
   a content ratio of strontium sulfate being no more than 11.7 wt %.

2. The cathode material according to claim 1, wherein the content ratio of strontium sulfate is at least 0.11 wt %.

3. A fuel cell comprising:
   an anode;
   a cathode including a main phase and a sub phase, the main phase comprising perovskite oxide which is expressed by the general formula $ABO_3$ and includes at least Sr at the A site and at least one of Co and Fe at the B site, the sub phase comprising strontium sulfate; and
   a solid electrolyte layer disposed between the anode and the cathode;
   an occupied area ratio of the sub phase in a cross section of the cathode being no more than 10.2%.

4. The fuel cell according to claim 3, wherein the occupied area ratio of the sub phase is at least 0.35%.

5. The fuel cell according to claim 3, wherein an average value of an equivalent circle diameter of particles in the sub phase in the cross section of the cathode is at least 0.05 micrometers to no more than 2 micrometers.

6. The fuel cell according to claim 3, wherein
a density of the sub phase is smaller than a density of the main phase.

7. The fuel cell according to claim 3, wherein
the perovskite oxide is LSCF.

8. A fuel cell comprising:
an anode;
a cathode including a main phase and a sub phase, the main phase comprising perovskite oxide which is expressed by the general formula $ABO_3$ and includes at least Sr at the A site and at least one of Co and Fe at the B site, the sub phase comprising strontium sulfate; and
a solid electrolyte layer disposed between the anode and the cathode;
the cathode including a solid electrolyte layer-side region within 3 micrometers from a surface near to the solid electrolyte layer, and
an occupied area ratio of the sub phase in a cross section of the solid electrolyte layer-side region of the cathode being no more than 10.2%.

9. The fuel cell according to claim 8, wherein
the occupied area ratio of the sub phase is at least 0.35%.

10. The fuel cell according to claim 8, wherein
a density of the sub phase is smaller than a density of the main phase.

11. The fuel cell according to claim 8, wherein
the perovskite oxide is LSCF.

\* \* \* \* \*